June 20, 1967 R. KONIAN 3,327,230

REGENERATOR

Filed Dec. 30, 1963

INVENTOR.
RICHARD KONIAN
BY
Edward J. Norton
Attorney

United States Patent Office 3,327,230
Patented June 20, 1967

3,327,230
REGENERATOR

Richard Konian, Long Island City, N.Y., assignor to Radio Corporation of America, a corporation of Delaware Filed Dec. 30, 1963, Ser. No. 334,218
9 Claims. (Cl. 328—164)

Figure 1:
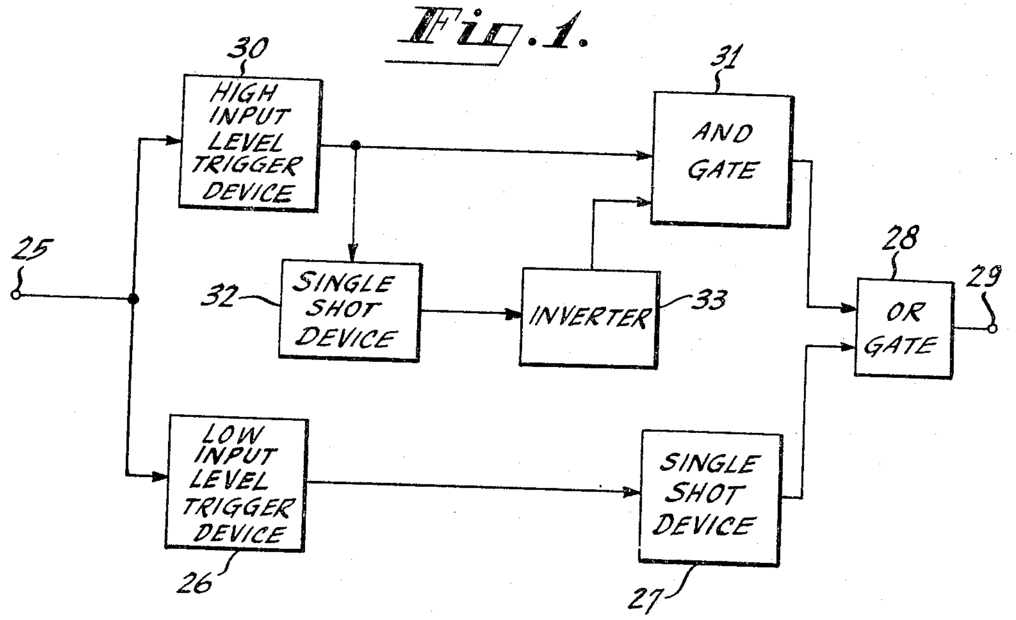

This invention relates to regenerators for digital signals, and, particularly, to an improved asynchronous regenerator for regenerating a random level digital signal.

As employed herein, the term digital signal refers to a signal which is switched or shifted between one level and another level to form a train of pulses. Information is carried in the signal by varying the frequency, width or some other parameter of the pulses. The levels between which the signal is shifted can be the same for each pulse, producing a train of pulses of substantially constant amplitude. In regenerating a signal including such a pulse train, it is customary to perform some type of single clipping or slicing operation. By determining the single slicing level at some point between the two signal levels, the pulses always rise from a level below the slicing level to a level above the slicing level. None of the information carried by the signal is lost.

There are, however, applications in which a digital signal having extreme amplitude variations occurs. The leading edge of successive pulses in the signal may begin at different levels rather than at the same level. The trailing edge of a pulse may end at a different level than that at which the leading edge of the pulse began. Such a random level digital signal may result from the manner in which the signal is originally generated or by the distortion of a digital signal fed over a communication or other path. Any attempt to regenerate such a random level digital signal by a single slicing or clipping operation results in the loss of information carried by the signal. If the slicing level is too low, information carried by the pulses either beginning or ending at a level above the slicing level is lost due to the fill-in of the signal by the slicing action. If the slicing level is too high, pulses occurring below the slicing level are removed from the signal by drop-out, again resulting in the loss of the information carried by the pulses.

It is an object of the invention to provide an improved regenerator for digital signals.

Another object is to provide an improved regenerator for asynchronously regenerating a digital signal having random amplitude variations with little or no loss of the information carried by the signal.

A further object is to provide an improved circuit arrangement for processing a random level digital signal of the type including a train of width-modulated pulses into a signal having only two levels.

Briefly, in the embodiment of the invention described herein, a regenerator utilizing two different slicing levels is provided for processing a random level digital signal including a train of width-modulated pulses into a two level digital signal. One of the slicing levels is determined so as to discriminate in favor of the low level pulses included in the received random level digital signal. A signal pulse of unvarying amplitude and width is produced at the output of the regenerator immediately upon the received signal level exceeding the slicing level. Assuming that the output of the regenerator is normally at a reference level, for example, zero volts, the regenerator output signal always begins and ends at the reference level for each of the pulses produced.

The second slicing level is determined so as to discriminate in favor of those pulses in the received digital signal which either begin or end at a level above the first slicing level. The output of the regenerator is made to remain at the same level or amplitude as that of the above-mentioned single pulses for as long as the received signal exceeds the second slicing level. Immediately upon the received signal level dropping below the second slicing level, the output of the regenerator is returned to the reference level for a given time interval. The output of the regenerator includes a clearly defined interval between the end of one pulse and the beginning of a succeeding pulse, even though the actual level of the received signal may not drop below the first slicing level. By determining the particular slicing levels employed in accordance with the characteristics of the received signal, the received signal is regenerated as a two level digital signal with little or no loss of the information carried by the signal.

Figure 2:
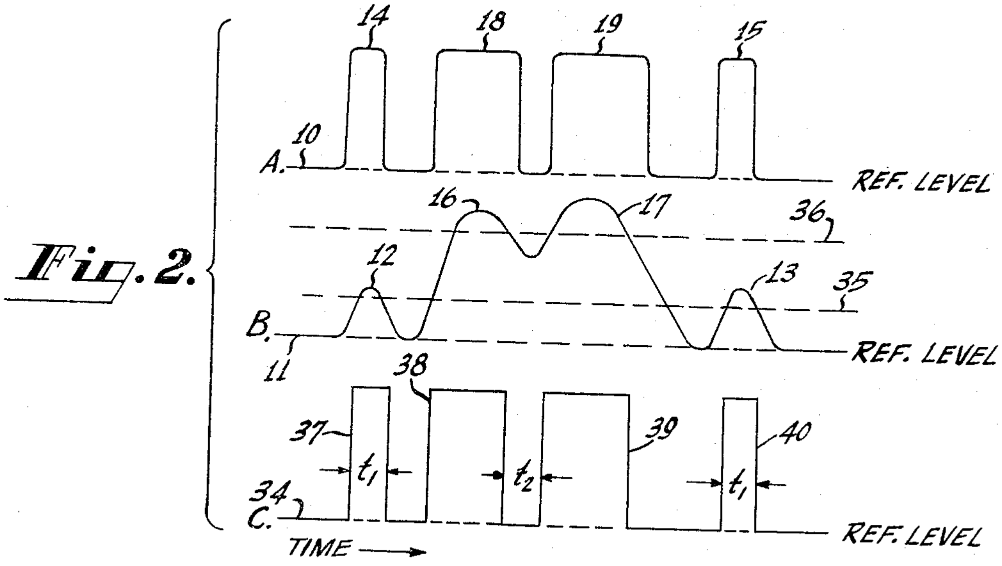

A more detailed description of the invention will now be given in connection with the accompanying drawing, in which:

FIG. 1 is a block diagram of a random level digital signal regenerator constructed according to one embodiment of the invention, and FIG. 2 is a series of waveforms useful in describing a typical operation of the embodiment shown in FIG. 1.

All ground symbols and common return paths are omitted in the block diagram of FIG. 1 in order to simplify the drawing. Such connections are provided in the customary manner.

A digital base band signal 10 of the type including width-modulated pulses is shown in waveform A of FIG. 2. Such a signal is employed in the operation of facsimile systems, as well as in other communication systems. Assuming that a facsimile signal is represented, the signal 10 typically remains at one level, shown as a reference level, for the transmission of white information and is switched to a second level for the transmission of black information. The signal can be considered as one which forwards white information except for those periods during which it is switched to the second level. The regeneration of a signal such as that shown in waveform A by using a single slicing or clipping technique is readily accomplished, since the signal switches only between two levels.

In forwarding the signal 10 shown in waveform A over a radio communication or other path, it may become amplitude distorted in the manner of the signal 11 shown in waveform B of FIG. 2. The greatest distortion occurs at the higher frequencies of the original signal 10 corresponding to the narrower pulse intervals. Thus, the pulses 12, 13 in the distorted signal 11 corresponding to the narrow pulses 14, 15, respectively, in the original signal 10 are more severly attenuated than are the pulses 16, 17 in the distorted signal 11 which correspond to the wider pulses 18, 19, respectively, in the original signal 10. Similarly, the narrow interval between the pulses 16, 17 is distorted to a greater extent than the interval between the pulses 12, 16 or the interval between the pulses 13, 17. Any attempt to regenerate a random level digital signal as shown in waveform B using a single slicing or clipping technique results in a loss of the information carried by the pulses in the signal. If the slicing level is set low in order to process the pulses 12 and 13, a fill-in of the regenerated signal occurs between pulses 16, 17 since the signal 11 does not drop below the slicing level at this point. If the slicing level is set high in order to process the signal interval between the pulses 16 and 17, the pulses 12 and 13 now occur below the slicing level and are completely dropped out of the regenerated signal. A regenerator capable of processing the random level digital signal 11 into a signal having only two levels without the drop-out of the pulses 12, 13 or the fill-in of the interval between pulses 16, 17 is provided by the embodiment shown in FIG. 1.

A random level digital signal such as that shown in waveform B of FIG. 2 is applied to an input terminal 25. The received signal is applied from the terminal 25 over one path to a low input level trigger device 26. The trigger device 26 has two states or conditions of operation. The trigger device 26 normally remains in a first one of its states, producing a signal of given level and polarity at its output. Upon the level of the signal received by the trigger device 26 exceeding a predetermined threshold value, the trigger device 26 assumes its second state and remains in the second state for as long as the received signal level exceeds the threshold value. When the trigger device 26 assumes its second state, the signal produced at the output of the trigger device 26 shifts in a given direction to a new level at which the output signal remains until the trigger device 26 again assumes its first state. The output signal produced by the trigger device 26 thereupon shifts back to the original level. It will be assumed that a positive-going transition takes place in the output signal level each time the trigger device 26 is shifted from its first state to its second state, and that a negative-going transition takes place in the output signal level each time the trigger device 26 is shifted from its second state to its first state. A Schmitt trigger is an example of one form which the trigger device 26 can take.

A single shot device 27 is connected to the output of the trigger device 26. The single shot device 27 can be a blocking oscillator, a monostable multivibrator, or any other structure which, when properly triggered, produces a single output pulse of given amplitude and width. The single shot device 27 is arranged to be triggered only in response to the positive-going transitions occurring in the output signal of the trigger device 26 upon the trigger device 26 being shifted from its first or normal state to its second state. The pulses produced at the output of the single shot device 27 are applied to an OR gate 28 and from the OR gate 28 to an output terminal 29.

The random level digital signal applied to the input terminal 25 is also applied over a second path to a high input level trigger device 30. The trigger device 30 is similar in construction and in operation to the trigger device 26 and, like the trigger device 26, can take the form of a Schmitt trigger or other arrangement switchable between two states as a function of a received signal level. The trigger device 30 switches from its first or normal state to its second state upon the level of the received signal exceeding a threshold value, the trigger device 30 returning to its first state upon the received signal level dropping below the threshold value. A two level signal appears at the output of the trigger device 30 including a positive-going transition from one level to a second level each time the trigger device 30 switches from its first state to its second state and a negative-going transition from the second level to the first level each time the trigger device 30 switches from its second state to its first state. The threshold value required to switch the trigger device 30 is set at a high level of the received signal than is the threshold value required to switch the trigger device 26.

The two level signal appearing at the output of the trigger device 30 is applied to an AND gate 31 and to a single shot device 32. The single shot device 32 can be of the same construction as the single shot device 27 and is of the type which, upon being triggered, produces a single output pulse of given amplitude and width. The single shot device 32 is arranged to be triggered only in response to the negative-going transitions occurring in the output signal of the trigger device 30 when the trigger device 30 switches from its second state to its first or normal state. Thusly, the single shot device 32 is triggered each time the level of the received signal applied to the input terminal 25 drops below the threshold value of the trigger device 30. This is in contrast to the operation of the single shot device 27 which is triggered each time the level of the received signal rises from a level below to a level above the threshold value of the trigger device 26.

The pulses produced at the output of the single shot device 32 are fed through an inverter 33 to the AND gate 31. The AND gate 31 is a coincident gating device which produces an output of given level and polarity only when the two inputs to the gate 31 are coincident at a given level and polarity. The AND gate 31, which can include the usual arrangement of unidirectional current conducting devices, for example, crystal diodes, will be described as one which produces a positive output only for two coincident, positive inputs. The input to the AND gate 31 from the inverter 33 is normally positive and the input to the AND gate 31 from the trigger device 30 is normally negative. In this condition, the output of the AND gate 31 remains at a reference level, for example, zero volts.

The output of the AND gate 31 is connected to the OR gate 28 and from theOR gate 28 to the output terminal 29. The OR gate 28, which can include the usual arrangement of unidirectional current conducting devices, for example, crystal diodes, is defined as one which provides a prescribed output condition when one or another prescribed input condition exists. As employed in the embodiment of FIG. 1, the OR gate 28 is one which produces a positive-going output at the output terminal 29 for a positive-going input from either the AND gate 31 or the single shot device 27 or both.

A typical operation of the embodiment shown in FIG. 1 will now be described with the aid of waveforms B and C presented in FIG. 2. Waveform C represents the regenerated two-level digital signal 34 produced by the embodiment of FIG. 1 at the output terminal 29 upon the random level digital signal 11 shown in waveform B being applied to the input terminal 25. Having made some approximation of the amount of amplitude distortion to be expected in the received signal 11 by monitoring the received signal 11 in any suitable manner, such as by oscilloscope observation, the threshold value of the low input level trigger device 26 is set at a level of the received signal 11 corresponding to the dashed line 35 in waveform B. The threshold value of the high input level trigger device 30 is set at a second level of the received signal 11 corresponding to the dashed line 36 in waveform B.

Upon the leading edge of the pulse 12 in the received signal 11 rising above the level 35, the trigger device 26 shifts from its normal state to its second state, producing a positive-going transition in the output signal of the trigger device 26. The single shot device 27 is triggered by this transition or positive edge and produces a single positive output pulse of a given amplitude and width $t_1$. The output pulse is passed by the OR gate 28, and appears at the output terminal 29 as the pulse 37 of the regenerated output signal 34, waveform C. During the period in which the single shot device 27 is producing the output pulse 37, it remains non-responsive to any change in the output signal of the trigger device 26.

In the case of the pulse 12, waveform B, the level of the received signal 11 drops below the level 35 prior to the occurrence of the trailing edge of the pulse appearing at the output of the single shot device 27. The trigger device 26 will have returned to its normal or first state before the termination of the pulse 37, waveform C. The regenerated signal 34 produced at the output terminal 29 returns at the conclusion of the pulse 37 to the reference level and remains thereat until the received signal level again exceeds the threshold value of the trigger device 26 corresponding to the level 35. Since the single shot device 27 is triggered only in response to the positive-going transitions in the output signal of the trigger device 26, the operation is the same should the level of the received signal 11 drop below the level 35 following the termination of the single pulse 37 produced by the single shot device 27.

The level of the received signal 11 during the period of the pulse 12 does not at any time rise above the threshold value of the high input level trigger device 30 corresponding to the level 36. The trigger device 30 remains in its normal state in which a negative input is provided from the output of the trigger device 30 to the AND gate 31. The reception at the input terminal 25 of the pulse 12 in the received signal 11 results only in the appearance at the output terminal 29 of the single pulse 37 produced by the single shot device 27.

It follows from the above description that for each pulse in the received signal 11 having a peak value above the level 35 but not above the level 36, a single pulse of fixed amplitude and width $t_1$ appears at the output terminal 29. The output pulse produced in the regenerated signal 34 will not in each case have the identical width of the corresponding pulse in the original signal, the precise width of the original pulse having been lost due to the introduction of amplitude distortion in the pulse signal. It has been found, however, that the width of the single output pulse produced in the regenerated signal 34 for each pulse in the received signal 11 having a peak value falling between the levels 35 and 36, can be selected to be a close approximation to that of the pulses in the original, undistorted signal. In one sense, an average width is determined so that it is substantially centered within the range extending from the original undistorted pulses of the narrowest width to the original undistorted pulses of the widest width. The actual timing of the single shot device 27 can be determined by monitoring the information recovered from the regenerated signal appearing at the output terminal 29. The timing is adjusted until a proper width for the pulses produced by the single shot device 27 is obtained which results in the minimum or small amount of error in the information recovered from the regenerated signal. The single shot device 27 is thereafter operated at this setting. In the case of a facsimile system, this operation has been found to result in little if any noticeable error in the recovered information.

Following the regeneration of the pulse 12 in the received signal 11 as the pulse 37 in the regenerated output signal 34, the level of the received signal 11 rises above the level 35 and the threshold value of the trigger device 26 to form the leading edge of the next pulse 16. The trigger device 26 changes state, and the single shot device 27 is triggered to produce an output pulse of the width $t_1$ at the output terminal 29. The output pulse has a leading edge occurring at the time the level of the received signal 11 crosses the threshold value of the trigger device 26 or level 35. Before the occurrence of the trailing edge of this pulse, the level of the received signal 11 rises above the level 36 or the threshold value of the high input level trigger device 30. The trigger device 30 shifts into its second state, providing a positive-going transition in the input to the AND gate 31 from the trigger device 30. Since both inputs to the AND gate 31 are now positive, a positive signal is passed by the AND gate 31 and the OR gate 28 to the output terminal 29. This positive signal from AND gate 31 is arranged to be of the same amplitude as that of the pulse then being produced by the single shot device 27.

When the trailing edge of the pulse produced by the single shot device 27 occurs, the received signal 11 is still at a level above the level 36 corresponding to the threshold value of the trigger device 30. The regenerated signal 34 appearing at the output terminal 29 remains at the existing positive level and continues in this condition for as long as the level of the received signal 11 stays above the threshold value of the trigger device 30. Immediately upon the level of the received signal dropping below the level 36, the trigger device 30 returns to its original state and a negative-going transition occurs in the output of the trigger device 30. The AND gate 31 is closed causing the regenerated signal 34 at the output terminal 29 to return to the reference level.

The single shot device 32 is triggered by the negative-going transition or negative edge in the output of the trigger device 30 and produces a single positive pulse of given amplitude and width. The positive pulse is inverted by the inverter 33 so that a negative input is applied to the AND gate 31. The AND gate 31 is in this manner made non-responsive to any change in the state of the trigger device 30 for a definite interval of time after a negative-going transition in the output of the high level trigger 30. The regenerated signal 34 includes a pulse 38 corresponding to the pulse 16 in the received signal 11 with the regenerated signal 34 remaining at the reference level for an interval $t_2$ determined by the timing of the single shot device 32. A clearly defined space or interval is produced in the regenerated signal 34 between the pulse 38 and a succeeding pulse formed therein. Any fill-in of the regenerated signal 34 which might otherwise occur due to the amplitude distortion of the interval between pulses in the received signal 11 is prevented. The timing of the single shot device 32 is adjusted to provide the proper spacing $t_2$ which prevents fill-in of the regenerated signal 34 while at the same time removing from the regenerated signal 34 as little of the information carried in the width of the pulses in the received signal 11 as possible. As in the case of the single shot device 27, the timing of the single shot device 32 can be adjusted by monitoring the information recovered from the regenerated signal 34, by comparing the input and output of the regenerator or by the use of any suitable arrangement.

The level of received signal 11 is shown in waveform B as having risen above the level 36 prior to the termination of the pulse produced by the single shot device 32. The trigger device 26 remains in its second state since the level of the received signal has not dropped below the level 35. Upon the termination of the pulse produced by the single shot device 32, the input to the AND gate 31 from the inverter 33 becomes positive. The input to the AND gate 31 from the trigger device 30 is also positive at this time, the trigger device 30 having assumed its second state. The leading edge of a pulse 39 is formed in the regenerated signal 34. The signal 34 assumes the same amplitude as that of the prior pulses 37, 38 and remains at that level for as long as the level of the received signal 11 remains above the level 36 and the threshold value of the trigger device 30.

When the level of the received signal 11 drops below the level 36, the trigger device 30 returns to its normal state. The single shot device 32 is triggered and the level of the regenerated signal 34 at the output terminal 29 drops to and remains at the reference level for at least the period $t_2$, forming the trailing edge of the pulse 39 which corresponds to the pulse 17 in the received signal 11. The level of the received signal 11 thereafter drops below the level 35, causing the trigger device 26 to return to its normal state. The single shot device 27 is not triggered at this time. The next pulse 13 in the received signal 11 is shown as having a peak value exceeding the level 35 but not the level 36. The low input level trigger device 26 and the single shot device 27 function as described above to produce a pulse 40 of width $t_1$ in the regenerated signal 34.

While a particular sequence of distorted pulses is shown in waveform B, the operation is the same regardless of the particular waveshape or sequence of distorted pulses in the received signal. The threshold value for the trigger device 26 is determined so that it discriminates in favor of the low level pulses in the received signal. The threshold value of the trigger device 26 can be set with due regard to the noise level of the received signal. The threshold value is set low enough to cause the trigger device 26 to be responsive to the informationn pulses present in the received signal without being overly responsive to the noise pulses or other low level distortion also present in the received signal.

The threshold value of the high input level trigger device 30 is determined so as to discriminate in favor of the pulses beginning or ending at a level above the threshold level of the trigger device 26. The threshold value is determined so that the trigger device 30 is responsive to the information pulses present in the received signal without being overly responsive to extraneous amplitude variations in the envelope of the received signal. The particular threshold values selected for the trigger devices 26 and 30 can be determined by the requirements of the particular application.

Increased accuracy in the regeneration of a received random level digital signal is possible by adjusting the timing of the single shot devices 27 and 32. The single shot devices 27 and 32 serve to provide sharp and clearly definable edges for the regenerated pulses and can be timed so that a maximum transfer of information results between the received random level digital signal and the two-level, regenerated digital signal.

Reference has been made to an application in which a digital signal, as shown in waveform A of FIG. 2, is first produced with the signal being distorted, as in waveform B of FIG. 2, during its transmission over a communication or other path. Various types of systems exist in which electrical signals are derived from a visible image such as that on a printed page. By way of example, it may be desired to transmit electrically the information on a printed page including printed material and notes made on the page in light pencil. Where both the notes and the printed material are to be transmitted as black on white information, for example, it is difficult to provide a pick-up means which translates both the notes and the printed material into a two-level signal.

As a practical matter, a random level signal much like that shown in waveform B of FIG. 2 results. The notes being of small intensity appear as the low level pulses with the printed material appearing as the higher level and wider pulses. An attempt to forward such a signal over a communication or other path may result in the information being substantialy obliterated by amplitude distortion. The arrangement described herein may be used to convert the random level signal as originally generated into a two-level signal with the operation being substantially the same as described above before any transmission of the signal takes place.

The operation of the arrangement of FIG. 1 depends upon sensing the level of the received signal rather than the frequency, and is, therefore, completely asynchronous. Because the arrangement is asynchronous in operation, it can be adapted for use in any system where it is desired to process a signal including randomly occuring width modulated pulses as is shown in the waveforms of FIG. 2. However, the arrangement may also be used in systems for processing a signal including pulses of constant width and/or frequency. Because of amplitude distortion introduced in such a signal, it may be difficult if not impossible, to regenerate the signal by a frequency domain analysis and synchronous operation. Since the arrangement is not frequency dependent, it can be operated as described above to convert the amplitude distorted pulses into a two-level digital signal, maintaining the regenerated pulses at substantially the same frequency and/or width as that of the original pulses prior to being distorted.

The term communication or other path referred to above is meant to include an arrangement for recording a signal on and reproducing a signal from a record medium. The medium can be magnetic tape or other means for storing signal information. The response of equipments of this type are known to result in the introduction of amplitude distortion in signals handled by the equipment, particularly where digital data signals at high frequency rates are processed. The arrangement is usable in such applications to provide for the proper recovery of the recorded information.

In a signal forwarding system of the type which includes a plurality of terminating points each connected to a signal source over a different path, the extent to which a signal is distorted over the respective paths can differ. One approach is to provide a single arrangement such as that of FIG. 1 for processing the signal from the source before it is forwarded over the respective paths. In any operation of this type, the processing circuit should be designed according to the poorest and the best signal condition existing on the respective paths. Overcorrection results with respect to some of the paths, and undercorrection results with respect to others. The arrangement described provides an inexpensive regenerator of simple construction and operation which can be located at each terminating point. Each regenerator can be individually adjusted to provide the best operation for the particular path in which it is connected, resulting in the improved performance of the overall system.

What is claimed is:

1. In combination, means providing a signal including a series of pulses of varying amplitude, an output means, third means responsive to said signal to produce in an output signal applied to said output means a single pulse of given amplitude and width for each of said first-mentioned pulses having a peak level between a first and a second level, fourth means responsive to said first-mentioned signal to cause said output signal to remain at said given amplitude for as long as the level of said first-mentioned signal exceeds said second level, and means for holding said fourth means nonresponsive to said first-mentioned signal during a given time interval following the dropping of the level of said first-mentioned signal below said second level regardless of any change in the level of said first-mentioned signal during said interval.

2. A regenerator for processing a random level digital signal comprising, in combination, a first trigger circuit responsive to said signal and operated to produce at an output means a single pulse of given amplitude and width each time the level of said signal exceeds a first level, a second trigger circuit responsive to said signal and operated to produce a pulse at said output means each time the level of said signal rises above a second level, each of said pulses produced by said second trigger circuit having a leading edge occurring at the time the level of said signal exceeds said second level and a trailing edge occurring when the level of said signal thereafter drops below said second level, and means for holding said second trigger circuit nonresponsive to said signal during a given time interval following each pulse produced by said second trigger circuit regardless of any change in the level of said signal during said interval.

3. In combination, first means providing a signal including a train of width modulated pulses of varying amplitude, second means responsive to said signal to produce at an output circuit a single pulse of given amplitude and width for each of said first-mentioned pulses having a peak level between a first and a second level, each of said pulses produced by said second means having a leading edge occurring at the time the level of said signal crosses said first level in one direction, third means responsive to said signal to produce at said output circuit a pulse of said given amplitude for each of said first-mentioned pulses having a peak level exceeding said second level in said one direction, each of said pulses produced by said third means having a leading edge occurring at the time the level of said signal crosses said second level in said one direction and a trailing edge occurring when the level of said signal next crosses said second level in the opposite direction said given width of the pulses produced by said second means being determined to cause when a pulse produced by said third means follows a pulse produced by said second means the trailing edge of the pulse produced by said second means to occur in time after said leading edge of the pulse produced by said third means.

4. In combination, means for providing a signal including a series of pulses of varying amplitude, second means responsive to said signal to produce at an output circuit a single pulse of given amplitude and width each time the level of said signal exceeds a first level, third means responsive to said signal to produce a pulse at said output circuit each time the level of said signal exceeds a second level higher than said first level, each of said pulses produced by said third means having a leading edge occurring at the time the level of said signal exceeds said second level and a trailing edge occurring when the level of said signal next drops below said second level, and fourth means for holding said third means nonresponsive to said signal during a given time interval following each pulse produced by said third means regardless of any change in the level of said signal during said interval.

5. In combination, input means adapted to receive a random level digital signal including a train of width modulated pulses, second means connected to said input means and responsive to said signal to produce at an output circuit a single pulse of given amplitude and width upon the level of said signal exceeding a first level in one direction, third means connected to said input means and responsive to each one of said first-mentioned pulses in said signal having a peak level exceeding a second level higher than said first level in said one direction to produce a pulse at said output circuit of said given amplitude and of a width corresponding to that of the received one of said first-mentioned pulses, said third means including a further means for holding said third means inoperative during a given time interval following each of said pulses produced by said third means regardless of the condition of said signal during said interval.

6. In combination, an input terminal adapted to receive an input signal of varying amplitude, a first trigger device connected to said input terminal and arranged to produce a pulse upon the level of said input signal crossing a first level in one direction, each of said pulses produced by said first trigger device having a leading edge occurring at the time the level of said input signal crosses said first level in said one direction and a trailing edge occurring when the level of the input signal next crosses said first level in the opposite direction, a single shot device connected to said first trigger device and responsive to the leading edge of each of said pulses to produce a pulse of given amplitude and width, an OR gate having one input connected to the output of said single shot device, a second trigger device connected to said input terminal and arranged to produce a pulse of said given amplitude upon the level of said input signal crossing a second level higher than said first level in said one direction, each of said pulses produced by said second trigger device having a leading edge occurring at the time the level of said input signal crosses said second level in said one direction and a trailing edge occurring at the time the level of said input signal crosses said second level in the opposite direction, an AND gate having one input connected to the output of said second trigger device, a second single shot device connected between the output of said second trigger device and a second input of said AND gate, the input to said AND gate from said second trigger device and said second single shot device being determined to cause said AND gate to pass said pulses produced by said second trigger device, said second single shot device being responsive to the trailing edge of each pulse produced by said second trigger device to alter the input from said second single shot device to said AND gate in a manner to render said AND gate non-responsive to the output of said second trigger device for a given interval after the trailing edge of each pulse produced by said second trigger device regardless of any change in the condition of said input signal and the response of said second trigger device thereto during said given interval, means to apply the pulses appearing at the output of said AND gate to a second input of said OR gate, said OR gate operating to add the pulses appearing at the output of said AND gate and the pulses produced at the output of said first single shot device into a single two-level signal, an output terminal, and meanse to apply said last-mentioned signal from the output of said OR gate to said output terminal.

7. A regenerator for processing a random level digital signal comprising in combination, a first trigger, activated by said signal to produce a single pulse of a given amplitude and width each time the level of said signal exceeds a first level, a second trigger activated by said signal to produce a pulse of said amplitude each time said signal level exceeds a higher level than said first level, a first single shot device connected to receive the output of said first trigger and to be activated when said first trigger is activated, a second single shot device connected to receive the output of said second trigger and to be activated for a given period when said second trigger returns from said activated to an inactivated condition, an AND gate having as one input the output of said second trigger in a polarity to enable said AND gate when said second trigger is activated and as another input the output of said second single shot in a polarity to disable said AND gate for said given period after said second trigger returns to said inactivated condition, and an OR gate connected to receive the output from said AND gate and the output from said first single shot.

8. In combination, means providing a signal of varying amplitude, an output means, means responsive to said signal to produce in an output signal applied to said output means a pulse each time the level of said signal exceeds a given level, each of said pulses produced by said responsive means having a leading edge occurring at the time the level of said signal exceeds said given level and a trailing edge occurring when the level of said signal next drops below said given level, and means for holding said responsive means nonresponsive to said signal during a given time interval following each pulse produced by said responsive means regardless of any change in the level of said signal during said interval.

9. In combination, first means providing a signal of varying amplitude, second means responsive to said signal to produce at an output circuit a single pulse of given amplitude and width each time said signal exceeds a first level, each of said pulses produced by said second means having a leading edge occurring at the time the level of said signal crosses said first level in one direction, third means responsive to said signal to produce at said output circuit a pulse of said given amplitude each time said signal level exceeds a second level higher than said first level in said one direction, each of said pulses produced by said third means having a leading edge occurring at the time the level of said signal crosses said second level in said one direction and a trailing edge occurring when the level of said signal next crosses said second level in the opposite direction, said given width of the pulses produced by said second means being determined to cause when a pulse, produced by said third means immediately follows a pulse produced by said second means the trailing edge of the pulse produced by said second means to occur in time after the leading edge of the pulse produced by said third means.

References Cited

UNITED STATES PATENTS

| | | | |
|---|---|---|---|
| 2,820,895 | 1/1958 | Johnstone ---------- | 328—117 |
| 3,028,558 | 4/1962 | Foglia ----------- | 328—151 X |

ARTHUR GAUSS, *Primary Examiner.*

J. ZAZWORSKY, *Assistant Examiner.*